United States Patent
Lingenfelder et al.

(10) Patent No.: US 9,390,377 B2
(45) Date of Patent: *Jul. 12, 2016

(54) ITERATIVE ACTIVE FEATURE EXTRACTION

(71) Applicant: International Business Machines Corporation, Armonk, NY (US)

(72) Inventors: Christoph Lingenfelder, Herrenberg (DE); Pascal Pompey, Nanterre (FR); Olivier Verscheure, Dunboyne (IE); Michael Wurst, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 467 days.

This patent is subject to a terminal disclaimer.

(21) Appl. No.: 13/785,132

(22) Filed: Mar. 5, 2013

(65) Prior Publication Data

US 2014/0180992 A1     Jun. 26, 2014

Related U.S. Application Data

(63) Continuation of application No. 13/723,699, filed on Dec. 21, 2012.

(51) Int. Cl.
  *G06N 5/02* (2006.01)
  *G06N 99/00* (2010.01)
  *G06N 5/04* (2006.01)

(52) U.S. Cl.
  CPC ............. *G06N 99/005* (2013.01); *G06N 5/02* (2013.01); *G06N 5/025* (2013.01); *G06N 5/043* (2013.01)

(58) Field of Classification Search
  None
  See application file for complete search history.

(56) References Cited

U.S. PATENT DOCUMENTS 6,004,015 A    12/1999  Watanabe et al.
2003/0212544 A1*  11/2003  Acero et al. .................. 704/9

(Continued)

FOREIGN PATENT DOCUMENTS

EP    0714069 A2    5/1996
JP    H0784983 A    3/1995

(Continued)

OTHER PUBLICATIONS

Burr Settles, "Active Learning Literature Survey," Computer Sciences Technical Report 1648, University of Wisconsin-Madison (2009).

(Continued)

*Primary Examiner* — Kakali Chaki
*Assistant Examiner* — Michael Zidanic
(74) *Attorney, Agent, or Firm* — Kurt P. Goudy; Michael J. Chang, LLC

(57) ABSTRACT

Techniques for iterative feature extraction using domain knowledge are provided. In one aspect, a method for feature extraction is provided. The method includes the following steps. At least one query to predict at least one future value of a given value series based on a statistical model is received. At least two predictions of the future value are produced fulfilling at least the properties of 1) each being as probable as possible given the statistical model and 2) being mutually divert (in terms of numerical distance measure). A user is queried to select one of the predictions. The user may be queried for textual annotations for the predictions. The annotations may be used to identify additional covariates to create an extended set of covariates. The extended set of covariates may be used to improve the accuracy of the statistical model.

18 Claims, 4 Drawing Sheets

(56) References Cited

U.S. PATENT DOCUMENTS

| | | | |
|---|---|---|---|
| 2004/0012633 A1* | 1/2004 | Helt | 345/764 |
| 2008/0177686 A1 | 7/2008 | Buyuktosunoglu et al. | |
| 2009/0292662 A1* | 11/2009 | Ueno et al. | 706/46 |
| 2010/0332201 A1* | 12/2010 | Albarede et al. | 703/2 |
| 2011/0246410 A1 | 10/2011 | Iizuka et al. | |
| 2012/0022952 A1* | 1/2012 | Cetin et al. | 705/14.73 |
| 2012/0109960 A1 | 5/2012 | Mishina et al. | |
| 2013/0096991 A1* | 4/2013 | Gardner et al. | 705/7.42 |

FOREIGN PATENT DOCUMENTS

| | | |
|---|---|---|
| JP | H0954765 A | 2/1997 |
| JP | 2011215884 A | 10/2011 |

OTHER PUBLICATIONS

T. Finley and T. Joachims, "Supervised Clustering with Support Vector Machines," Proceedings of the International Conference on Machine Learning (ICML), 2005.

Chaudhuri et al., "Generalized regression trees," Statistica Sinica, v. 5, pp. 641-666 (1995).

Kelsey, DW. et al., "Detection and prediction of a stochastic process having multiple hypotheses," Proceedings of the 1971 IEEE Conference on Decision and Control (Including the 10th Symposium on Adaptive Processes); pp. 552-556; IEEE; 1971.

Kelsey, DW. et al., "Detection and prediction of a stochastic process having multiple hypotheses," Information Sciences, vol. 6, No. 4, pp. 301-311; Oct. 1973.

Anonymous, "Using multiple predictions and standard statistical measures to reduce false positives during real-time, time series analysis of metrics which measure operating system behavior," IPCOM/000195181D; Apr. 22, 2010.

Doria, A. et al., "A Set of Possible Requirements for a Future Routing Architecture," IPCOM/000193349D; Feb. 19, 2010.

S.H. Doong et al., "Secondary Structure Prediction Using SVM and Clustering," Proceedings of the Fourth International Conference on Hybrid Intelligent Systems (HIS '04), Dec. 5-8, 2004.

* cited by examiner

ITERATIVE ACTIVE FEATURE EXTRACTION

CROSS-REFERENCE TO RELATED APPLICATION(S)

This application is a continuation of U.S. application Ser. No. 13/723,699 filed on Dec. 21, 2012, the disclosure of which is incorporated by reference herein.

FIELD OF THE INVENTION

The present invention relates to data analysis and mining and more particularly, to techniques for iterative feature extraction using domain knowledge.

BACKGROUND OF THE INVENTION

Prediction of future or otherwise unknown events plays an important role in many applications. Most conventional techniques for automatic forecasting assume some stationary behavior or semi-fixed seasonalities.

This is oftentimes not appropriate, as many, partially not observable variables can influence the behavior of a process. Assume, for instance, that the water consumption of a building depends not only on the weather, the number of people, etc. but also on the fact of whether (or not) there is a maintenance scheduled for that day (i.e., wherein it is assumed that the maintenance affects water consumption—for instance people tend not to stay in the building when maintenance tasks are being performed and/or the water supply is shut off).

Thus, if there is maintenance being performed, the water consumption in the building is low. If there is no maintenance, the water consumption in the building would be higher. Without the knowledge of whether there is a maintenance task one cannot automatically distinguish which of both holds. Existing prediction techniques optimize their predictions to reduce an error function with respect to a single prediction, thus they would choose any value in between, usually far away from any of the ways the series actually evolves. Such techniques are described, for example, in T. Hastie et al., "Elements of Statistical Learning, Data Mining, Inference, and Prediction" Springer Series in Statistics (2009).

The only way to come up with better predictions is by adding additional variables that would separate both cases. However, it is usually quite unclear which variables this should be. Mapping the complete domain knowledge is mostly infeasible and would be prohibitively expensive. Furthermore, information about maintainance tasks and similar events might not be updated properly as the value is not clear at the time of entering this information or at the time the forecasting is done.

Thus, improved prediction model techniques would be desirable.

SUMMARY OF THE INVENTION

The present invention provides techniques for iterative feature extraction using domain knowledge. In one aspect of the invention, a method for feature extraction is provided. The method includes the following steps. At least one query to predict at least one future value of a given value series based on a statistical model is received. At least two predictions of the future value are produced fulfilling at least the properties of 1) each being as probable as possible given the statistical model and 2) being mutually divert (in terms of numerical distance measure). A user is queried to select one of the predictions. The user may be queried for textual annotations for the predictions. The annotations may be used to identify additional covariates to create an extended set of covariates. The extended set of covariates may be used to improve the accuracy of the statistical model.

A more complete understanding of the present invention, as well as further features and advantages of the present invention, will be obtained by reference to the following detailed description and drawings.

DETAILED DESCRIPTION OF PREFERRED EMBODIMENTS

The following are definitions of some terms used in the description:

Training data—data on which the model is trained. Training data consists of a set of data points.

Training data point—data point used for training. A training data point is represented in terms of several covariates (features, e.g., temperature) that are used to forecast a future value (e.g., energy consumption in 24 h).

New data point—data for which a prediction is required. Here it is assumed that a new data point is expressed with the same covariates as the training data.

Data clusters—clusters of the training data. On each cluster a prediction model is trained.

Prediction clusters—clusters of data clusters. With each cluster several prediction models can be associated, the final prediction is determined based on majority vote.

Figure 1:
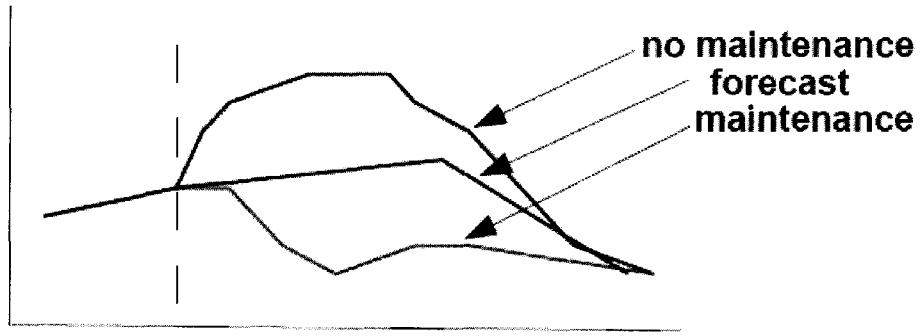
FIG. 1 is a diagram illustrating an exemplary prediction scenario according to an embodiment of the present invention.

As provided above, conventional prediction techniques optimize their predictions with respect to a single prediction. As a result, the predictions are imprecise. Take for instance the example provided above regarding the water consumption of a building. Among other factors such as the weather and the number of people, the water consumption in the building is also affected by whether or not maintenance tasks are being performed. This exemplary scenario is shown illustrated in FIG. 1, wherein the top curve represents the water consumption in the building when no maintenance is being performed, and the bottom curve represents the water consumption in the building when maintenance tasks are being performed. With conventional prediction techniques that seek to reduce an error function with respect to a single prediction, the predictions (labeled "forecast" in FIG. 1) end up being far away from any of the ways the series actually evolves. See FIG. 1.

In order to improve the predictions, additional variables are needed that would separate both cases. However, as highlighted above, it is sometimes difficult to know ahead of time what the relevant variables for the model might be (since mapping the complete domain knowledge is neither practical nor feasible). Further, information about maintenance tasks and similar events might not be updated properly as the value of these variables may not be clear at the time of entering this information or even at the time the forecasting is done.

Advantageously, provided herein are techniques for extracting these features in a "lazy" way, after the prediction model has been built. This is achieved by returning a set of (i.e., multiple) predictions (instead of a single one) that are as diverse as possible and still, each of which is as likely as possible. This enables a domain expert or, in general, any kind of oracle that would have access to non-trivial data or transformations, to apply additional knowledge (e.g., whether there is a maintenance task) and thus complete the prediction "lazily" by choosing from the different predictions. The user or oracle can also annotate any of the predictions with tags, that could, over time, evolve into features that are actually used in creating a more elaborate model beforehand. In general, an oracle is a human annotator, e.g., a domain expert, who possesses relevant data regarding a given application domain. As will be described in detail below, many relevant features of a given application domain are present only in the heads of a domain expert or oracle. By way of example only, in the case of the water consumption scenario provided above, the domain expert or oracle might be a maintenance coordinator who is responsible for scheduling maintenance tasks. This person would have knowledge of when the maintenance tasks will be performed and thus when water consumption data will be affected. For the sake of simplicity, the terms "user" and "oracle" will be used interchangeably in the following description.

The present techniques provide advancements to some existing techniques in data analysis and mining. For example, feature extraction is usually done by transforming existing features into new ones, based on a supervised learning task. See, for example, Liu et al., "Feature extraction, construction and selection: a data mining perspective," Kluwer Academic Publishers, Norwell, Mass., USA (2008) (hereinafter "Liu"), the contents of which are incorporated by reference herein. The approach described in Liu is used extensively for feature extraction from multi-media data. However, as highlighted above, in many application domains relevant features exist only in the heads of the domain experts and cannot be extracted from existing data at all. Take as an example the case of a maintenance task event and its relation to water consumption data. The occurrence of a maintenance event in the future may only be within the scope of knowledge of an expert in that domain (e.g., a maintenance coordinator).

Multiple prediction models are often created implicitly, by running the same algorithm with different parameters to find an optimal model. This can also mean finding multiple models that are Pareto optimal to each other given a multi-objective optimization. See, for example, Yaochu Jin (Ed.) "Multi-objective machine learning," Springer, Berlin Heidelberg (2006) (hereinafter "Jin"), the contents of which are incorporated by reference herein. However, these processes try to find different models in terms of optimization criteria or optimization method, not in terms of predictions. Also, there is no loop back from the expert user into the system.

Active learning is used to lazily obtain new training examples for a given learning task either from a human user or any kind of oracle that would be able to label examples. See, for example, Burr Settles, "Active Learning Literature Survey," Computer Sciences Technical Report 1648, University of Wisconsin-Madison (2009) (hereinafter "Settles"), the contents of which are incorporated by reference herein. However, additional examples do not help if actually what is missing are relevant features. As provided above, these relevant features may exist solely in the minds of domain experts. Also, by comparison with the present techniques, active learning confronts the oracle with additional examples to label, not with different predictions for a single case.

Figure 2:
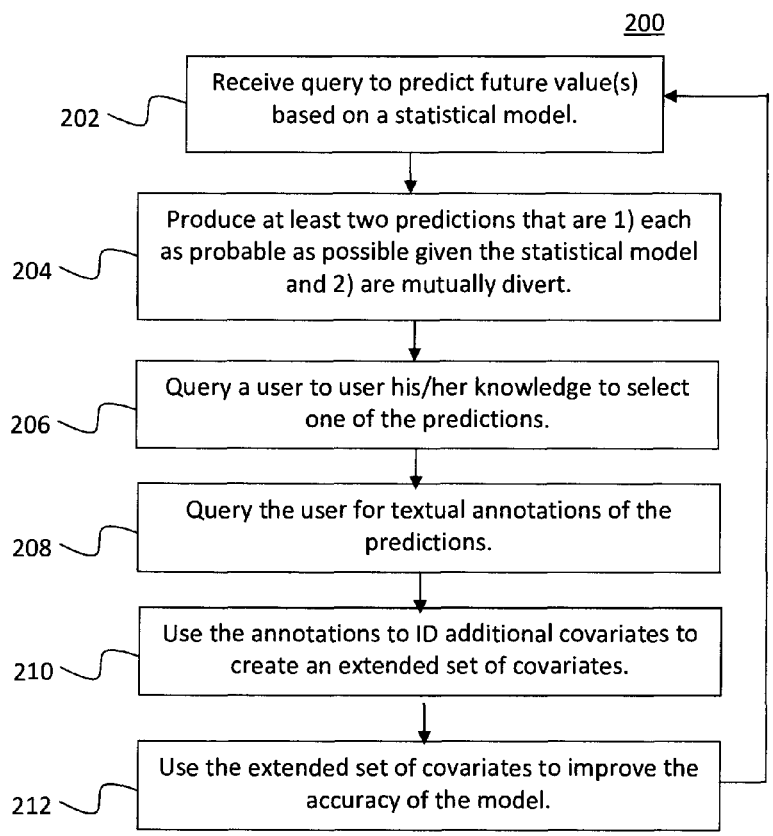
FIG. 2 is a diagram illustrating an exemplary methodology for iterative feature extraction according to an embodiment of the present invention.

An overview of the present techniques is provided by way of reference to methodology 200 shown illustrated in FIG. 2. As provided above, the present techniques provide a method to extract additional variables from domain experts (or any kind of oracle). Namely, in step 202, a query is received that asks for a prediction of a future value or values of a given value series based on a statistical model. The specific statistical model employed can vary depending on the application at hand, and it is assumed here that one of skill in the art would be able to determine the appropriate statistical models for a given situation. By way of example only, suitable statistical models can range from simple auto-regressive models, such as autoregressive integrated moving average (ARIMA), to very complex regression models, such as Generalized Additive Models based on many external covariates. These statistical models are known to those of skill in the art and thus are not described in further detail herein. In the exemplary scenario provided above, the query in this step would focus on predicting future water consumption values.

In step 204, the present prediction engine (see below) produces multiple (i.e., at least two) predictions of the future value(s). According to an exemplary embodiment, the predictions made in this step need to meet two qualifications. First, the predictions are each as probable as possible given the statistical model. This would mean, for instance, that the true value is with high probability in a small interval around the predicted value.

Second, the predictions are mutually diverse (e.g., in terms of numerical distance measure). This means that the proposed predictions need to be far away from each other, as could be measured by general purpose distance measures, such as Euclidean distance, or with distance measures special to a given application area.

Both criteria (i.e., the predictions being 1) as probable as possible and 2) mutually diverse) can be specified in different ways, in one exemplary embodiment they would be, for instance, implemented in the following way. The problem of finding mutually diverse and still probable predictions can be formalized as an optimization problem with two objectives. Assume that there are k predictions y1 ... yk and an unknown true value y. Both could be in any domain, for now it is assumed they are in R. The first objective—obtaining predictions that are as probable as possible—can be formalized, for instance, in the following way. A parameter e>0 is first defined. For each prediction yi, the absolute distance to the unknown true value y', measured as |yi−y'|, is configured to be smaller than e with a probability larger than p0. This can easily be generalized to use other distance measures, such as Euclidean distance. The distance parameter is usually set based on domain knowledge. It is further assumed that the user sets a threshold on the probability p0, such that predictions that are less likely are not considered. The second objective—obtaining diverse predictions—can be formalized by maximizing the sum of pair-wise distances between all predictions y1 . . . yk. Again, any kind of distance measure could be used, such as the Euclidean distance.

Next, in order to gain the user's knowledge of the domain (i.e., as provided above user is synonymous with oracle—e.g., domain expert) in step 206, the user is queried to select one of the (multiple) predictions generated in step 204. Using the exemplary scenario presented above regarding water consumption predictions, the user (e.g., a maintenance coordinator—or other domain expert with knowledge of when a maintenance event will occur) would be in a unique position to know which of the water consumption predictions is most likely. By contrast, without knowledge of the upcoming maintenance events the predictions might be significantly less precise (see for example FIG. 1, described above).

According to an exemplary embodiment, the user is presented with the multiple predictions generated in step 204. As provided above, these predictions are each as probable as possible, but are as different from one another as possible. The user can then be queried to select, based on the knowledge he/she possesses which is the most probable prediction. In this manner, the benefit of insight from a domain expert is leveraged to aid in distinguishing between multiple predictions, all of which are probable from a purely statistical point of view.

The present process might be performed in an iterative manner to further enhance the accuracy of the predictions produced. For instance, in step 208, the user is queried to add textual annotations to the predictions. Textual annotations can include, for example, placing tags or labels on the predictions. For instance, in the context of the water consumption example provided above, the user (who assume for example is a domain expert with knowledge of when a maintenance event is going to occur) might annotate predictions that predict a large amount of water consumption during the period when the user knows a maintenance event is scheduled to occur as "unlikely" or "not relevant."

According to an exemplary embodiment, in future iterations of the process, the annotations (e.g., tags) placed on the predictions by the users are displayed along with the associated prediction, such that users evaluating the predictions can see what annotations were previously made. That way, the users can benefit from observations made by other domain experts in the past and/or from observations the same user made in the past.

The statistical model is created (e.g., by a statistician—see below) based on a set of variables or covariates. In order to increase the accuracy of the predictions based on the model, in step 210, the textual annotations provided by the user or users are then used to identify additional covariates to provide as variables to build the statistical model. These additional covariates are added to the variables used to model the domain forming an extended set of covariates.

In step 212, this extended set of covariates is used to improve the accuracy of the statistical model. Namely, as will be described in detail below a statistician who models the domain can use this extended set of covariates as variables to create the statistical model. As shown in FIG. 2, this process can be performed iteratively. At each iteration, any information garnered from users can serve to further increase the accuracy of the predictions. Ultimately, these annotations (i.e., tags) can be used to decide which features to extract beforehand. This is achieved by analyzing the annotation of the domain experts for influence factors that occur often. A statistician could, for instance, monitor that "maintenance" is often used to tag the correct prediction. In this case, the IT department could be asked to put a process in place that would force facility managers to provide this information beforehand and add it as a permanent feature to the statistical models. This active feature extraction process when performed in an iterative manner as described herein serves to increase the accuracy of the domain models and of the predictions generated from the models.

The present techniques address the common problem that important domain information is missing when building and applying prediction models. This often happens as domain users do not see the value of keeping this information up to date or to even enter it into an IT system. By making this feature extraction lazy, the domain experts can apply their knowledge as part of the prediction. Over time, the value of this information becomes obvious and can then be used to successfully enforce feature extraction of previously implicit knowledge.

Figure 3:
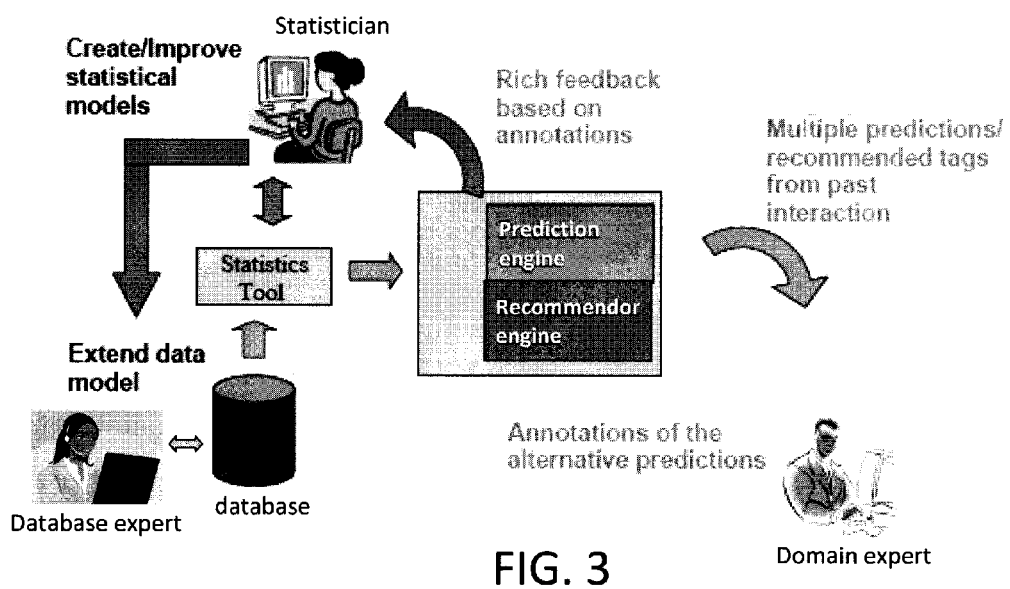
FIG. 3 is a schematic diagram illustrating the present iterative feature extraction process according to an embodiment of the present invention.

FIG. 3 is a schematic diagram illustrating the present process. As shown in FIG. 3, the workflow in a forecasting system involves several roles. A statistician models a domain by deciding which variables should be used to forecast a given set of values. Then, the appropriate data is collected (for example from a database—see FIG. 3) or transformed accordingly by a database expert. As shown in FIG. 3, this data can be collected from a database. Based on this data, the actual forecasting model is built by the statistician using any suitable statistical forecasting method. See FIG. 3 stage labeled "Create/Improve statistical models." As described above, the present process is iterative and additional covariates based on input from domain experts can be used by the statistician to improve the statistical model. By way of example only, a suitable statistical forecasting method includes, but is not limited to, SPSS predictive analytic tools available from International Business Machines Corporation. The statistical forecasting method/tool used by the statistician to create the statistical model from the variables the statistician selects and the data collected is represented generically by the block labeled "Statistics Tool" in FIG. 3.

In a conventional scenario, the data model obtained from the statistician is then deployed into production and is used by frontline employees to whom it returns a single most probable forecast for a given problem, possibly together with an error margin. A typical example is energy consumption forecasting: the statistician creates a model that takes several variables into account that the statistician came up with based on his/her assumptions about causal factors and knowledge of the domain. These variables might be the time of day, the day of week and the outside temperature. Then the system is deployed and produces a single most probable forecast based on these variables. However, if there are influential variables that were not considered by the statistician, either because he/she did not know about them or because they emerged later, the single forecast may be grossly inaccurate. The only thing current systems allow to do in this case is to go back to the statistician and complain that the forecasts are of low quality. This, however, does not help to reveal the root cause, namely the missing latent (hidden) information.

Advantageously, with the present techniques, this problem is solved by providing the front-line employees with several alternative predictions (see label "Multiple predictions" in FIG. 3) in cases in which a single one would produce a large expected error. Then, as described above, the domain expert(s) (in this example the front-line employees are the domain experts) can annotate these alternative predictions with free text tags (e.g., "maintenance") that might help to distinguish between the alternatives. Over time, these tags are collected and can be provided to other front-line employees— domain experts (see above where it is described how the predictions can be displayed with tags provided by the domain expert).

Finally, this information (predictions annotated with tags by the domain experts) is given back to the statistician (see label "Rich feedback based on annotations" in FIG. 3) who can, based on the tags, determine what information is actually missing and how to incorporate it into the model. The database expert would actually add the missing information to the system and retrain the forecasting models (extend the data model) with this additional information so as to improve the statistical models. Usually, this will be an ongoing process. As data modelling and pre-processing takes up to 70% of the resources in a forecasting project, the present techniques could help to significantly increase predictive quality, reduce cost and deploy projects faster.

As shown in FIG. 3, the prediction engine is modified to produce multiple predictions instead of a single one, as described above. Two possible embodiments on how to achieve this are provided below. Optionally, a recommendation engine proposes tags or other forms of textual annotations if a situation occurs that shows similar predictions as in a past situation (using, for example, Euclidean distance between the past and the forecast). See label "recommended tags from past interactions" in FIG. 3. Tags are fed back to the statistician's system who can use this information to remodel the domain (and improve the statistical model).

The present approach requires finding (multiple) predictions that are all likely but mutually as diverse as possible and also a mechanism to identify whether a proposed prediction is similar to a past one, for which a tag by the same or a different user is already available. This similarity could be measured, for instance, as Euclidean distance between the past and the forecast. The measurement of similarity between predictions using a Euclidean distance measure would be apparent to one of skill in the art. In the following, two exemplary embodiments are described that may be implemented to provide these predictions. Beginning with the statistical model, training data (i.e., a training data set) is used to train the statistical model. This training data will be referred to herein as training data points. Each training data point is a set of covariates together with a known prediction gathered from historical data (for instance, it is known from past data that a certain amount of water consumption in a building occurred in the past at a certain time/day of the week). For a new data point, only the covariates are known, not the prediction. The aim is to produce alternative predictions for this new data point.

The first exemplary embodiment is based on the following method. The idea is to first cluster all training data points (which each contain a set of covariates along with a known prediction and which are collected from historical data as described above) into a set of clusters using the covariates only. This clustering can be based on any known existing multi-variate clustering method, ranging from simple methods, such as k-means, to methods that take the prediction problem into account, such as supervised clustering.

For a description of supervised clustering see, for example, T. Finley and T. Joachims, "Supervised Clustering with Support Vector Machines," Proceedings of the International Conference on Machine Learning (ICML), 2005 (hereinafter "Finley"), the contents of which are incorporated by reference herein. Finley describes supervised clustering as a problem of training a clustering algorithm to produce desirable clusterings. Namely, given multiple sets of items and complete clusterings over the sets, Finley describes supervised clustering as using this training input to cluster future sets of items. The techniques in Finley adapt an item-pair similarity measure.

Figure 4:
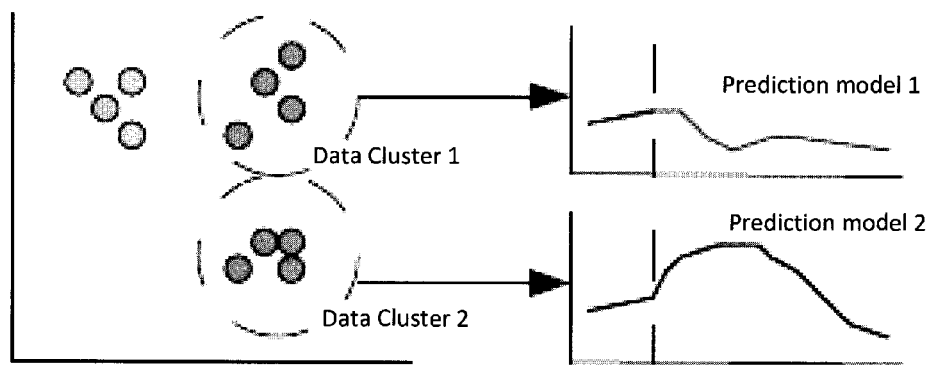
FIG. 4 is a diagram illustrating an exemplary embodiment for creating multiple predictions by first clustering all data points into a set of clusters and then for each cluster in the set, creating a prediction model according to an embodiment of the present invention.

Next, for each cluster of training data in the set, a prediction model is created using only the data points in that cluster. The term "prediction model" as used herein refers to the model resulting from training the statistical model (provided by the statistician—see above) with the training data from a particular cluster. Again, any forecasting process could be used for that (e.g., ARIMA, Generalized Additive Models, etc. see above). See FIG. 4. So basically, the training data is clustered (into multiple clusters) and the clustered data is then used to train the statistical model to produce multiple "prediction models" (one prediction model is derived from each cluster). This is depicted schematically in FIG. 4. As shown in FIG. 4, the training data for the domain is clustered, and then a "prediction model" is created from each of the clusters (i.e., by training the statistical model with data from the cluster).

At prediction time, the 1 most similar clusters are identified for a given new data point to be predicted using the same method and distance measure as for clustering, in case of k-means, this would be the Squared Euclidian distance to the cluster centroids. A second clustering method is then used to cluster the 1 clusters into a small number of k "prediction clusters." See also FIG. 6, described below. For this step, an adapted version of agglomerative clustering is applied that will be described in the following. Given a larger set of predictions y'1 ... y'm, derived from the most similar clusters, a bottom-up agglomerative clustering process is applied to cluster these predictions, using the same distance measure as above, e.g., Euclidean distance. Agglomerative processes work by merging, in each step, the two clusters that are closest to each other, given the "single-link" distance measure. The process starts with one cluster per data point. In addition, in each step of the process, the probability for each prediction cluster is computed. Each prediction cluster that exceeds the minimal probability p0 (as defined above) is removed from the process. This process is repeated until we reach k clusters with minimal probability or as the root of the clustering tree is reached. For each of these "prediction clusters" a single prediction is derived by majority vote among the models that belong to that prediction cluster—i.e., as described above, a prediction model is created for each cluster of training data points—multiple m clusters are then clustered into "prediction clusters," thus each prediction cluster might have multiple prediction models associated therewith.

Using this bottom up approach, it is ensured that the predictions produced are mutually as far away from each other as possible, using the distance measure defined above, e.g., Euclidean distance. By using the constraint on the probability, it is ensured that no unlikely predictions are returned. The probability of each cluster is determined in a way that depends on the underlying models. It is assumed that the models in a prediction cluster will provide a forecast yj and a probability that the prediction is within distance e of the true value, as defined above. From this a single forecast is derived as the unweighted average of the predictions of all models in the cluster. The probability that this average forecast is within a distance e of the true value can be calculated using the average of the probabilities of all the forecasts or more sophisticated methods, e.g., Monte-Carlo sampling.

The predictions derived from the multiple "prediction clusters" are presented to the user as described above—i.e., the result of performing the above process will be at least two predictions that are each as probable as possible given the statistical model and mutually divert. If a user annotates a prediction with a tag, then this tag is added to all original clusters, thus all clusters that belong to the prediction cluster. In turn, on a prediction, the union of all tags associated to any clusters belonging to a prediction cluster is returned using any ranking scheme (in the simplest case, the frequency of occurrence).

An alternative embodiment that can be used to find (multiple) predictions that are all likely but mutually as diverse as possible is based on regression trees. See, for example, Chaudhuri et al., "Generalized regression trees," Statistica Sinica, v. 5, pgs. 641-666 (1995), the contents of which are incorporated by reference herein. The basic idea is the same as for the clustering method described above. The difference is that first a regression tree is derived using the training data points, such that each leaf node of the tree contains a set of training data points. Then, for each leaf node separately, the true values associated with training data points are clustered to derive a set of alternative prediction clusters for each leaf node of the tree again using a similarity measure for predictions, such as the Euclidean distance. This produces a set of "prediction clusters" for each leaf node. As a forecast is generated, we first navigate to the right leaf node in the tree and then return the centroids or any other representative value for of the "prediction clusters" as forecasts. The difference between both methods is in the way the initial clusters are derived. The process of how to obtain the "prediction clusters" and how forecasts are generated from them was described above, and operates in the same manner here as well. The method based on regression tree performs most of the work at modelling time, such that it is very fast at prediction time, the method based on clustering is more flexible, though requires more computation at prediction time which might not be desirable.

Figure 5:
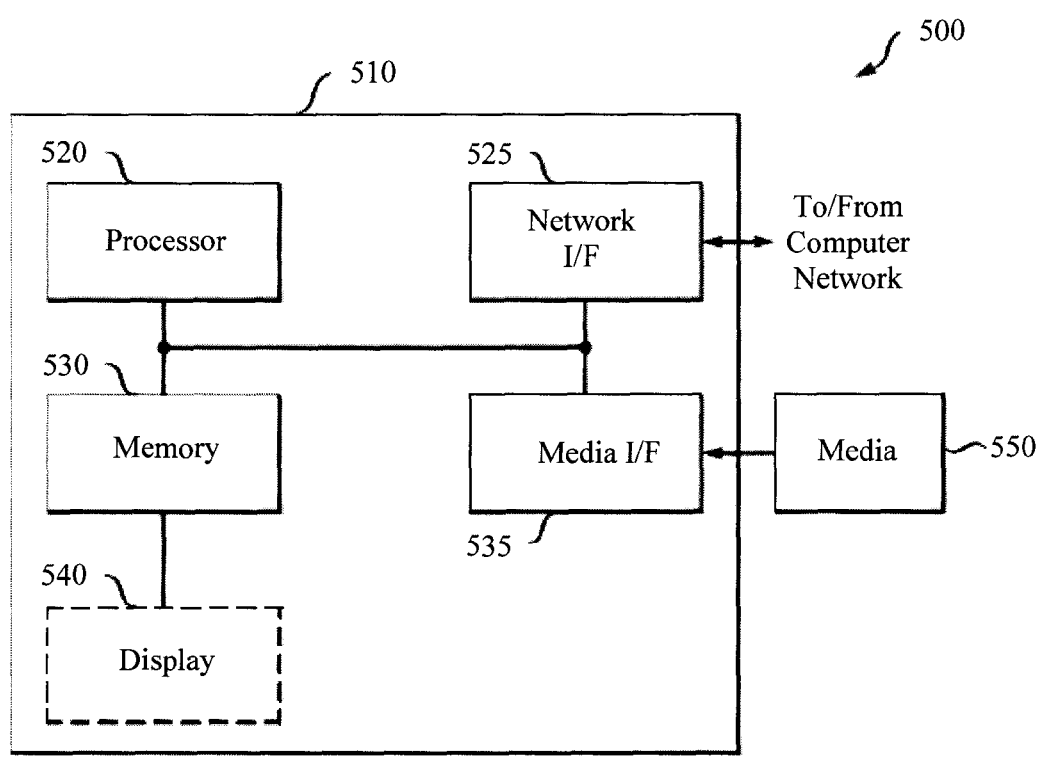
FIG. 5 is a diagram illustrating an exemplary apparatus for performing one or more of the methodologies presented herein according to an embodiment of the present invention.

Turning now to FIG. 5, a block diagram is shown of an apparatus 500 for implementing one or more of the methodologies presented herein. By way of example only, apparatus 500 can be configured to implement one or more of the steps of methodology 200 of FIG. 2 for iterative feature extraction. For instance, the prediction engine and the recommender engine described in conjunction with the description of FIG. 3, above, may be embodied in apparatus 500 which can be configured to perform the iterative feature extraction method described herein.

Apparatus 500 comprises a computer system 510 and removable media 550. Computer system 510 comprises a processor device 520, a network interface 525, a memory 530, a media interface 535 and an optional display 540. Network interface 525 allows computer system 510 to connect to a network, while media interface 535 allows computer system 510 to interact with media, such as a hard drive or removable media 550.

As is known in the art, the methods and apparatus discussed herein may be distributed as an article of manufacture that itself comprises a machine-readable medium containing one or more programs which when executed implement embodiments of the present invention. For instance, when apparatus 500 is configured to implement one or more of the steps of methodology 200 the machine-readable medium may contain a program configured to a) receive at least one query to predict at least one future value of a given value series based on a statistical model; b) produce at least two predictions of the future value fulfilling at least the properties of 1) each being as probable as possible given the statistical model and 2) being mutually divert (in terms of numerical distance measure); and c) query a user to select one of the predictions. The program may be further configured to d) query the user for textual annotations for the predictions; e) use the annotations to identify additional covariates to create an extended set of covariates; and f) use the extended set of covariates to improve the accuracy of the statistical model.

The machine-readable medium may be a recordable medium (e.g., floppy disks, hard drive, optical disks such as removable media 550, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 520 can be configured to implement the methods, steps, and functions disclosed herein. The memory 530 could be distributed or local and the processor device 520 could be distributed or singular. The memory 530 could be implemented as an electrical, magnetic or optical memory, or any combination of these or other types of storage devices. Moreover, the term "memory" should be construed broadly enough to encompass any information able to be read from, or written to, an address in the addressable space accessed by processor device 520. With this definition, information on a network, accessible through network interface 525, is still within memory 530 because the processor device 520 can retrieve the information from the network. It should be noted that each distributed processor that makes up processor device 520 generally contains its own addressable memory space. It should also be noted that some or all of computer system 510 can be incorporated into an application-specific or general-use integrated circuit.

Optional display 540 is any type of display suitable for interacting with a human user of apparatus 500. Generally, display 540 is a computer monitor or other similar display.

Figure 6:
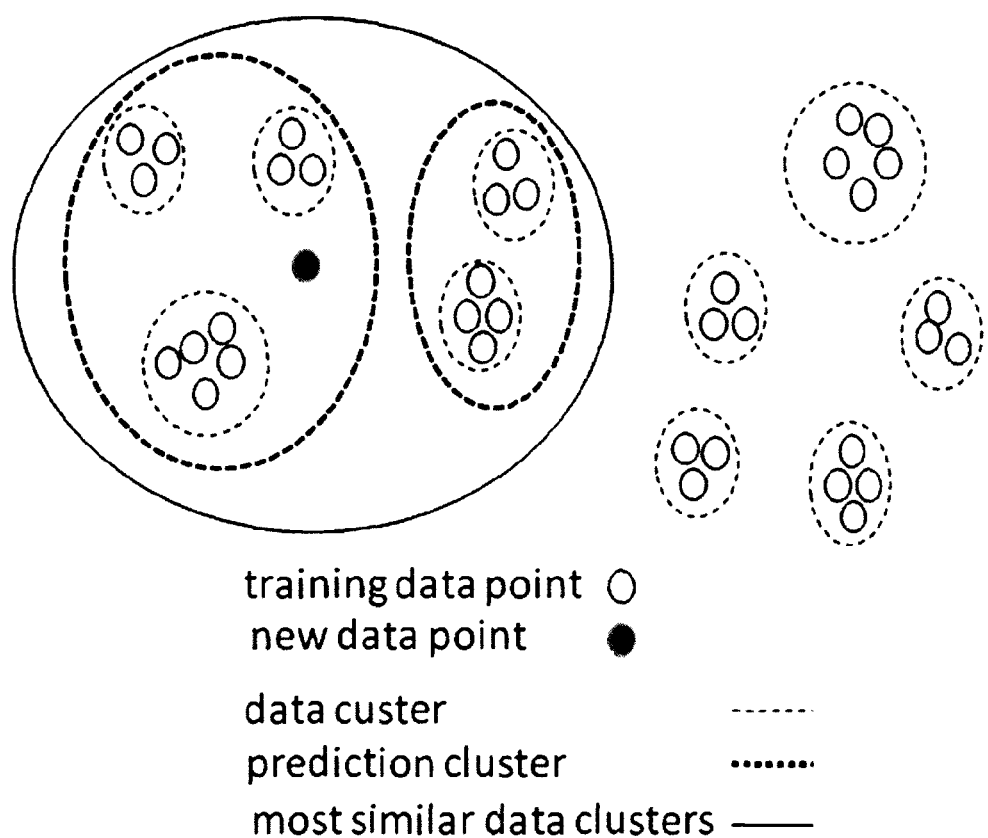
FIG. 6 is a diagram which depicts schematically a clustering process according to the present techniques that is used to predict a new data point according to an embodiment of the present invention.

FIG. 6 is a diagram which depicts schematically the above-described clustering process to predict a new data point. As described above, the most similar data clusters are identified for the new data point using the same method and distance measure as for clustering. In FIG. 6, the data clusters are encircled with a light dashed line and the most similar data clusters are encircled with a solid line. A second clustering method is then used to cluster the similar clusters into a small number of "prediction clusters." In FIG. 6, the prediction clusters are encircled with a heavy dashed line. As described above, this step involves use of an adapted version of agglomerative clustering. Additionally, in each step of the process, the probability for each prediction cluster is computed and each prediction cluster that exceeds the minimal probability is removed from the process.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. An apparatus for feature extraction, the apparatus comprising:
   a memory; and
   at least one processor device, coupled to the memory, operative to:
   a) receive at least one query to predict at least one future value of a given value series;
   b) generate a statistical model built on covariates to produce at least two predictions of the future value fulfilling at least the properties of 1) each being as statistically probable as possible given the statistical model wherein to be as statistically probable as possible an absolute distance of each of the predictions to a true value is less than a predetermined distance parameter with greater than a predetermined probability and 2) being mutually divert in terms of a numerical distance measure; and c) query a user to select one of the predictions.

2. The apparatus of claim 1, wherein the at least one processor device is further operative to:

d) query the user for textual annotations for the predictions;
e) use the annotations to identify additional covariates to create an extended set of covariates; and
f) use the extended set of covariates to improve the accuracy of the statistical model.

3. The apparatus of claim 1, wherein the at least one processor device is further operative to:

present the predictions to the user; and
query the user to select which of the predictions the user believes is most probable.

4. The apparatus of claim 2, wherein the textual annotations comprise tags.

5. The apparatus of claim 2, wherein the at least one processor device is further operative to:

repeat the steps a-f in an iterative manner with the extended set of covariates.

6. The apparatus of claim 5, wherein the at least one processor device is further operative to:

at each iteration, display the textual annotations from previous iterations with the predictions.

7. The apparatus of claim 1, wherein the at least one processor device is further operative to:

obtain the statistical model.

8. The apparatus of claim 7, wherein the statistical model is obtained from a statistician.

9. The apparatus of claim 1, wherein the at least one processor device is further operative to:

recommend textual annotations from past interactions.

10. An article of manufacture for feature extraction, comprising a non-transitory machine-readable recordable medium containing one or more programs which when executed implement the steps of:

a) receiving at least one query to predict at least one future value of a given value series;
b) generating a statistical model built on covariates to produce at least two predictions of the future value fulfilling at least the properties of 1) each being as statistically probable as possible given the statistical model wherein to be as statistically probable as possible an absolute distance of each of the predictions to a true value is less than a predetermined distance parameter with greater than a predetermined probability and 2) being mutually divert in terms of a numerical distance measure; and c) querying a user to select one of the predictions.

11. The article of manufacture of claim 10, wherein the one or more programs which when executed further implement the steps of:

d) querying the user for textual annotations for the predictions;
e) using the annotations to identify additional covariates to create an extended set of covariates; and
f) using the extended set of covariates to improve the accuracy of the statistical model.

12. The article of manufacture of claim 10, wherein the one or more programs which when executed further implement the steps of:

presenting the predictions to the user; and
querying the user to select which of the predictions the user believes is most probable.

13. The article of manufacture of claim 11, wherein the textual annotations comprise tags.

14. The article of manufacture of claim 11, wherein the one or more programs which when executed further implement the step of:

repeating the steps a-f in an iterative manner with the extended set of covariates.

15. The article of manufacture of claim 14, wherein the one or more programs which when executed further implement the step of:

at each iteration, displaying the textual annotations from previous iterations with the predictions.

16. The article of manufacture of claim 10, wherein the one or more programs which when executed further implement the step of:

obtaining the statistical model.

17. The article of manufacture of claim 16, wherein the statistical model is obtained from a statistician.

18. The article of manufacture of claim 10, wherein the one or more programs which when executed further implement the steps of:

recommend textual annotations from past interactions.

* * * * *